United States Patent [19]
Kuroiwa et al.

[11] 3,847,806
[45] Nov. 12, 1974

[54] METHOD FOR TREATING SLUDGE FORMED IN CITY SEWAGE SYSTEMS

[75] Inventors: Tadaharu Kuroiwa; Yukio Isayama; Akira Yokota; Tsukasa Kamio; Kazuhiko Jinnai; Eiichi Abe; Kunio Kimura, all of Tosu; Morihisa Hioki, Kagoshima; Hisataka Noguchi, Hachioji, all of Japan

[73] Assignee: Director-General of the Agency of Industrial Science and Technology, Tokyo, Japan

[22] Filed: Mar. 8, 1973

[21] Appl. No.: 339,132

[30]     Foreign Application Priority Data
Mar. 21, 1972    Japan.............................. 47-28308

[52] U.S. Cl.................. 210/45, 106/97, 210/75, 210/500, 252/449
[51] Int. Cl............................................ B01d 37/02
[58] Field of Search............. 210/45, 51, 52, 53, 71, 210/75, 152, 193, 500; 106/DIG. 2, 97; 252/378 P, 449

[56]     References Cited
UNITED STATES PATENTS

| | | | |
|---|---|---|---|
| 2,829,773 | 4/1958 | Saddington | 210/75 |
| 3,441,515 | 4/1969 | Oshida et al. | 210/502 |
| 3,440,166 | 4/1969 | Davis et al. | 210/67 X |
| 3,442,498 | 5/1969 | Davis | 210/67 X |
| 1,892,681 | 1/1933 | Rankin | 210/152 X |
| 2,665,813 | 1/1954 | Bollaert et al. | 210/75 X |
| 3,233,740 | 2/1966 | Vander Linden et al. | 210/500 |

*Primary Examiner*—John Adee
*Assistant Examiner*—Robert G. Mukai
*Attorney, Agent, or Firm*—William J. Daniel

[57]     ABSTRACT

This invention relates to a method for effectively treating sludge formed in city sewer systems. More particularly, this invention relates to a method for obtaining lightweight foamed materials useful as fillers which comprises adding, on filtration of sludge formed in the purification treatment of city sewers, foaming granular volcanic ash deposits to the sludge to facilitate the filtration treatment and utilizing the filtration residue as a lightweight foamed material.

10 Claims, No Drawings range from 20 μ to 0.6 mm, and preferably 0.1–0.3 mm.

According to one embodiment of this invention, granular particles of the foaming volcanic ash deposits are added to sewage sludge in such a ratio that 3–10 parts by weight of the volcanic ash deposits are added for one part by weight of the total evaporation residue of the sludge and the mixture is thoroughly mixed and then filtered. Thus, the sludge can be dehydrated effectively without using any coagulating agent.

According to another embodiment of this invention, it is possible to use the granular particles of the foaming volcanic ash deposits jointly with a coagulating agent used conventionally for this purpose. In this case, the amount of coagulating agent added can significantly be decreased as compared with the case of known conventional methods. For example, the dehydration effect is remarkably enhanced to minimize the residual moisture content in a filter cake by adding the foaming volcanic ash deposits and a coagulating agent to the sewage sludge in such a ration that 1–5 parts by weight of the foaming volcanic ash deposits and only 0.001–0.005 part by weight of the coagulating agent are added for one part by weight of a total evaporation residue of the sludge and then filtering the mixture. Preferred coagulating agents utilizable jointly with the foaming volcanic ash deposits include, for example, Kurifloc LC–599 (Kurita Kogyo, Japan), Hymorock (sic.) M–166 (Kyoritsu Yuki Kogyo, Japan) and Primafloc C–7 (Nippon Degramon, Japan).

In the method of this invention, the dehydration treatment by filtration can be conducted, for example, with the aid of a rotary vacuum filtering machine or filter press.

A filter cake obtained by the dehydration treatment usually contains 40–60 percent by weight of moisture and a solid material thereof consists of 50–85 percent by weight of the foaming volcanic ash deposits. The filter cake is then incinerated for about 1–2 minutes at a temperature of 900°–1,200°C whereby organic ingredients contained therein are eliminated by combustion and lightweight granular foamed particles composed predominantly of vitreous hollow microspherical particles are obtained. The incineration treatment in this case can be carried out by using an adequate heating device such as a gas furnance of heavy oil furnace.

The lightweight granular foamed particles thus obtained are a gray to light brown substance having a weight per given volume of 0.25–0.85 and tolerate a high temperature up to about 1,000°C. When the product colored in white is desired, the incineration treatment has to be carried out in a reducing atmosphere or, alternatively, a chemical treatment is necessary. In addition to the desirable properties such as lightweight, non-combustibility, high melting point and low thermoconductivity, the lightweight granular foamed particles have no toxicity and permit no evolution of toxic or harmful gases on heating. By virtue of these characteristic properties, the lightweight granular foamed particles are suitable as filler for Portland cement, gypsum, water glass, ceramics, metals, plastics, asphalt and rubber.

As stated above, this invention contemplates not only effective dehydration of sludge by utilizing the special effect of foaming volcanic ash deposits as filtering assistant and a synergistic effect of the ash deposits with a coagulating agent, but also conversion of the dehydrated residue into the lightweight granular foamed particles useful as filler. This invention is, therefore, a very effective and useful method for treating sewage sludge, since it can achieve the effects superior to those achieved by the known conventional methods with little or no use of expensive coagulating agents.

This invention will be understood more readily by reference to the following examples. However, these examples are only intended to illustrate this invention and are not to be construed as limiting the scope of the invention.

EXAMPLE 1

Sewage sludge is extracted from a sludge digestion tank in a Kinko sewage treatment plant belonging to Kagoshima Waterworks Bureau. A given amount of Shirasu and/or a given amount of a coagulating agent is added to the sludge, the given amount being based on 100 parts by weight of a total evaporation residue of the sludge. The mixture is dehydrated by filtration under reduced pressure of 500 mmHg, using a vacuum filtering machine. Table 1 shows the amount of sludge treated (the amount of sludge treated at a given area for a given period of time) and the moisture content of the resultant filter cake.

Shirasu used in this example is extracted at Furue, Kanoya City, Kagoshima prefecture and has the chemical and mineral compositions shown below.

| Results of Chemical Analysis | | Mineral Content | |
|---|---|---|---|
| $SiO_2$ | 70.36% | Volcanic Vitreous Material | 66.31% |
| $Al_2O_3$ | 13.16 | | |
| $FeO$ | 1.41 | Feldspar-quartz | 31.11% |
| $Fe_2O_3$ | 0.92 | | |
| $CaO$ | 2.58 | Hypersthene | |
| $MgO$ | 0.62 | Magnetite | 2.58% |
| $Na_2O$ | 3.20 | Other | |
| $K_2O$ | 2.95 | | |
| $TiO_2$ | 0.32 | | |
| $MnO$ | 0.06 | | |
| $P_2O_5$ | 0.02 | | |
| $H_2O^-$ | 1.04 | | |
| $H_2O^+$ | 3.49 | | |

For the purpose of comparison, the amount of sludge treated in the case of adding nothing to the same sludge and the moisture content of the filter cake obtained are also shown in Table 1 below.

TABLE 1

| Additive | Experiment No. (Parts By Wt — Dry Wt Basis) | | | | | | | |
|---|---|---|---|---|---|---|---|---|
| | 1 | 2 | 3 | 4 | 5 | 6 | 7 | 8 |
| Shirasu | 0 | 0 | 500 | 500 | 1000 | 0 | 300 | 300 |
| Ferric Chloride | 6 | 7 | 1 | 0 | 0 | 0 | 0 | 0 |
| Slaked Lime | 10 | 50 | 10 | 0 | 0 | 0 | 0 | 0 |
| Organic Coagulant | 0 | 0 | 0 | 0 | 0 | 0.8[1] | 0.4[1] | 0.3[2] | range from 20 μ to 0.6 mm, and preferably 0.1–0.3 mm.

According to one embodiment of this invention, granular particles of the foaming volcanic ash deposits are added to sewage sludge in such a ratio that 3–10 parts by weight of the volcanic ash deposits are added for one part by weight of the total evaporation residue of the sludge and the mixture is thoroughly mixed and then filtered. Thus, the sludge can be dehydrated effectively without using any coagulating agent.

According to another embodiment of this invention, it is possible to use the granular particles of the foaming volcanic ash deposits jointly with a coagulating agent used conventionally for this purpose. In this case, the amount of coagulating agent added can significantly be decreased as compared with the case of known conventional methods. For example, the dehydration effect is remarkably enhanced to minimize the residual moisture content in a filter cake by adding the foaming volcanic ash deposits and a coagulating agent to the sewage sludge in such a ration that 1–5 parts by weight of the foaming volcanic ash deposits and only 0.001–0.005 part by weight of the coagulating agent are added for one part by weight of a total evaporation residue of the sludge and then filtering the mixture. Preferred coagulating agents utilizable jointly with the foaming volcanic ash deposits include, for example, Kurifloc LC-599 (Kurita Kogyo, Japan), Hymorock (sic.) M-166 (Kyoritsu Yuki Kogyo, Japan) and Primafloc C-7 (Nippon Degramon, Japan).

In the method of this invention, the dehydration treatment by filtration can be conducted, for example, with the aid of a rotary vacuum filtering machine or filter press.

A filter cake obtained by the dehydration treatment usually contains 40–60 percent by weight of moisture and a solid material thereof consists of 50–85 percent by weight of the foaming volcanic ash deposits. The filter cake is then incinerated for about 1–2 minutes at a temperature of 900°–1,200°C whereby organic ingredients contained therein are eliminated by combustion and lightweight granular foamed particles composed predominantly of vitreous hollow microspherical particles are obtained. The incineration treatment in this case can be carried out by using an adequate heating device such as a gas furnance of heavy oil furnace.

The lightweight granular foamed particles thus obtained are a gray to light brown substance having a weight per given volume of 0.25–0.85 and tolerate a high temperature up to about 1,000°C. When the product colored in white is desired, the incineration treatment has to be carried out in a reducing atmosphere or, alternatively, a chemical treatment is necessary. In addition to the desirable properties such as lightweight, non-combustibility, high melting point and low thermoconductivity, the lightweight granular foamed particles have no toxicity and permit no evolution of toxic or harmful gases on heating. By virtue of these characteristic properties, the lightweight granular foamed particles are suitable as filler for Portland cement, gypsum, water glass, ceramics, metals, plastics, asphalt and rubber.

As stated above, this invention contemplates not only effective dehydration of sludge by utilizing the special effect of foaming volcanic ash deposits as filtering assistant and a synergistic effect of the ash deposits with a coagulating agent, but also conversion of the dehydrated residue into the lightweight granular foamed particles useful as filler. This invention is, therefore, a very effective and useful method for treating sewage sludge, since it can achieve the effects superior to those achieved by the known conventional methods with little or no use of expensive coagulating agents.

This invention will be understood more readily by reference to the following examples. However, these examples are only intended to illustrate this invention and are not to be construed as limiting the scope of the invention.

EXAMPLE 1

Sewage sludge is extracted from a sludge digestion tank in a Kinko sewage treatment plant belonging to Kagoshima Waterworks Bureau. A given amount of Shirasu and/or a given amount of a coagulating agent is added to the sludge, the given amount being based on 100 parts by weight of a total evaporation residue of the sludge. The mixture is dehydrated by filtration under reduced pressure of 500 mmHg, using a vacuum filtering machine. Table 1 shows the amount of sludge treated (the amount of sludge treated at a given area for a given period of time) and the moisture content of the resultant filter cake.

Shirasu used in this example is extracted at Furue, Kanoya City, Kagoshima prefecture and has the chemical and mineral compositions shown below.

| Results of Chemical Analysis | | Mineral Content | |
|---|---|---|---|
| $SiO_2$ | 70.36% | Volcanic Vitreous Material | 66.31% |
| $Al_2O_3$ | 13.16 | | |
| $FeO$ | 1.41 | Feldspar-quartz | 31.11% |
| $Fe_2O_3$ | 0.92 | | |
| $CaO$ | 2.58 | Hypersthene | |
| $MgO$ | 0.62 | Magnetite | 2.58% |
| $Na_2O$ | 3.20 | Other | |
| $K_2O$ | 2.95 | | |
| $TiO_2$ | 0.32 | | |
| $MnO$ | 0.06 | | |
| $P_2O_5$ | 0.02 | | |
| $H_2O^-$ | 1.04 | | |
| $H_2O^+$ | 3.49 | | |

For the purpose of comparison, the amount of sludge treated in the case of adding nothing to the same sludge and the moisture content of the filter cake obtained are also shown in Table 1 below.

TABLE 1

| | Experiment No. (Parts By Wt — Dry Wt Basis) | | | | | | | |
|---|---|---|---|---|---|---|---|---|
| Additive | 1 | 2 | 3 | 4 | 5 | 6 | 7 | 8 |
| Shirasu | 0 | 0 | 500 | 500 | 1000 | 0 | 300 | 300 |
| Ferric Chloride | 6 | 7 | 1 | 0 | 0 | 0 | 0 | 0 |
| Slaked Lime | 10 | 50 | 10 | 0 | 0 | 0 | 0 | 0 |
| Organic Coagulant | 0 | 0 | 0 | 0 | 0 | 0.8[1] | 0.4[1] | 0.3[2] |

TABLE 1 -Continued

| Additive | Experiment No. (Parts By Wt — Dry Wt Basis) | | | | | | | |
|---|---|---|---|---|---|---|---|---|
| | 1 | 2 | 3 | 4 | 5 | 6 | 7 | 8 |
| Results | | | | | | | | |
| Amount of Sludge Treated (kg/m²/hr) | 5 | 5.5 | 11 | 5.5 | 8.5 | 4.8 | 13 | 9.0 |
| Amount of Filter Cake Treated (kg/m²/hr) | 5.5 | 8 | 67 | 33 | 94 | 4.8 | 52.5 | 36 |
| Moisture Content (wt.%) | 80 | 78 | 70 | 60 | 50 | 80 | 40 | 45 |

[1] Primafloc C-7
[2] Hymotock (sic) M-166

EXAMPLE 2

The filter cakes obtained in Exp. Nos. 4 and 5 of Example 1 are dried by heating at 100°C until moisture is evaporated. These filter cakes are then pulverized, charged into a rotary kiln having a diameter of 150 mm and a length of 2,000 mm and then incinerated at 950°C for about two minutes. A gray incinerated material is thus obtained which mainly contained lightweight foamed particles. The properties of the products are shown in Table 2.

TABLE 2

| Exp. No. | Content Shirasu (Parts By wt.) | Wt per Unit Volume (kg/l) | | |
|---|---|---|---|---|
| 4 | 500 | 0.51 | | |
| 5 | 1000 | 0.42 | | |
| | Particle Size of Incinerated Material (wt. % thru mesh Sieve in mm) | | | |
| Exp. No. | 0.59 | 0.297 | 0.147 | 0.074 | 0.044 |
| 4 | 96.2 | 76.3 | 53.2 | 31.1 | 21.3 |
| 5 | 97.5 | 80.7 | 61.0 | 39.1 | 24.4 |

EXAMPLE 3

The filter cakes obtained in Exp. Nos. 3, 7 and 8 of Example 1 are incinerated for about 2 minutes at 980°C in a manner similar to that described in Example 2. The properties of the products thus obtained are shown in Table 3.

TABLE 3

| Exp. No. | Content Shirasu (Parts By wt.) | Coagulating Agent (Parts By wt.) | | Wt per Unit Volume (kg/l) |
|---|---|---|---|---|
| 3 | 500 | Ferric Chloride | 1 | 0.55 |
| 7 | 300 | Primafloc C-7 | 0.4 | 0.40 |
| 8 | 300 | M-166 | 0.3 | 0.35 |
| | Particle Size of Incinerated Material (wt. % thru Mesh Sieve in mm) | | | |
| Exp. No. | 0.57 | 0.297 | 0.149 | 0.074 | 0.044 |
| 3 | 95.8 | 76.7 | 42.8 | 30.0 | 22.5 |
| 7 | 97.5 | 80.0 | 59.5 | 38.5 | 24.6 |
| 8 | 99.1 | 82.5 | 64.4 | 45.6 | 31.0 |

EXAMPLE 4

The lightweight foamed products obtained in Examples 2 and 3 are admixed with ordinary Portland cement. The mixtures are converted into cement mortar and tested to determine the flow, the compression and bending strength after hardening for 28 days, the specific gravity after air drying, the water absorption rate after 24 hours, and thermoconductivity. For the purpose of comparison, a similar cement mortar is made by using a known filler (Mitsui Pearlite) and similarly tested. The results of these tests are shown in Table 4 below.

TABLE 4

| Type Particles | Mixing Ratio By Volume (Cement/Part.) | Cement Ratio (%) | Flow (mm) | Comp. Str. (kg./cm²) |
|---|---|---|---|---|
| Exp. No. 4 | 1:3 | 60 | 150 | 110.0 |
| Exp. No. 3 | 1:3 | 62 | 150 | 101.5 |
| Exp. No. 7 | 1:3 | 65 | 150 | 98.7 |
| Mitsui Pearlite | 1:3 | 110 | 180 | 65.1 |
| Type Particles | Bend. Str. (kg./cm²) | Sp. Gr. | H₂O Absp. | Ther. Cond.[1] |
| Exp. No. 4 | 40.0 | 0.95 | 30.2 | 0.28 |
| Exp. No. 3 | 38.5 | 0.82 | 31.1 | 0.25 |
| Exp. No. 7 | 30.5 | 0.79 | 32.0 | 0.23 |
| Mitsui Pearlite | 17.3 | 0.80 | 31.6 | 0.13 |

[1] Measured in (Kcal/m²·hr·°C)

The above results lead to the following technical effects and merits. (1) Comparing a prior art method (where ferric chloride and slaked lime are used as coagulating agents) with the method of this invention where Shirasu as a filtration assistant is jointly used with ferric chloride and slaked lime, the amount of sludge treated by the method of this invention is increased to almost twice that treated in the prior art method, even if the amount of ferric chloride is decreased in this invention to 1/6–1/7. In addition, the moisture content of the residual filter cake is decreased from about 80 wt. percent to 50 wt. percent in the case of this invention.

(2) Comparing the above prior art method with the method of this invention where Shirasu alone is used, the method of this invention can attain, even without any known coagulating agent, a filtration effect at least equivalent to that of the prior art method when Shirasu is added in an amount of five times as much as the total evaporation residue. The moisture content of the filter cake is decreased in the case of this invention.

(3) Where the amount of Shirasu used is doubled to equal 10 times the total evaporation residue, the amount of sludge filtered is increased and the moisture content of the filter cake decreased.

(4) Comparing the case where Shirasu is used jointly with conventional inorganic coagulating agents, such as ferric chloride and slaked lime, with the case where Shirasu is used jointly with an organic coagulating agent, such as Primafloc C-7, the amount of Shirasu added in the latter case can be decreased by 40 percent while the amount of sludge filtered in the latter case is increased, even if the amount of the coagulating agent added is decreased by about 25 percent, the moisture content of the filter cake in either instance is decreased.

What is claimed is:

1. A method of improving the filtration of sewage sludge and recovering a useful product therefrom which comprises the steps of:
   1. mixing sewage sludge with unfoamed foamable granular volcanic ash particles, in a weight ratio of about 3–10:1 relative to the dry weight of said sludge, said volcanic ash particles having a diameter of about $20\mu$–0.6 mm,
   2. filtering the resultant mixture,
   3. incinerating the filtered mixture to foam said volcanic ash particles, and
   4. recovering the incinerated product.

2. The method of claim 1 wherein said volcanic ash particles are Shirasu.

3. The method of claim 1 wherein said volcanic ash particles have a diameter of about 0.1–0.3 mm.

4. The method of claim 1 wherein said filtered mixture is incinerated at a temperature of about 900°–1,200°C for at least 1 minute.

5. The product obtained by the process of claim 1.

6. A method of improving the filtration of sewage sludge and recovering a useful product therefrom which comprises the steps of:
   1. mixing sewage sludge with unfoamed foamable granular volcanic ash particles having a diameter of about $20\mu$–0.6 mm in a weight ratio of 1–5:1 relative to the dry weight of said sludge together with about 0.001–0.005 parts by weight of a coagulating agent,
   2. filtering the resultant mixture,
   3. incinerating the filtered mixture to foam said volcanic ash particles, and
   4. recovering the incinerated product.

7. The method of claim 6 wherein said volcanic ash particles are Shirasu.

8. The method of claim 6 wherein said volcanic ash particles have a diameter of about 0.1–0.3 mm.

9. The method of claim 6 wherein said filtered mixture is incinerated at a temperature of about 900°–1200°C for at least one minute.

10. The product obtained by the process of claim 6.

* * * * *